(12) United States Patent
Takeda et al.

(10) Patent No.: US 7,366,065 B2
(45) Date of Patent: Apr. 29, 2008

(54) OPTICAL DISK APPARATUS AND AN OPTICAL DISK RECORDING AND REPRODUCING METHOD

(75) Inventors: Nobuhiro Takeda, Tokyo (JP); Motoyuki Suzuki, Yokohama (JP)

(73) Assignees: Hitachi Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 537 days.

(21) Appl. No.: 10/986,169

(22) Filed: Nov. 12, 2004

(65) Prior Publication Data

US 2005/0128901 A1 Jun. 16, 2005

(30) Foreign Application Priority Data

Dec. 11, 2003 (JP) .............................. 2003-413395

(51) Int. Cl.
*G11B 7/00* (2006.01)
(52) U.S. Cl. .................................. 369/44.29; 369/44.35
(58) Field of Classification Search ...................... None
See application file for complete search history.

(56) References Cited

U.S. PATENT DOCUMENTS 5,757,748 A * 5/1998 Kiyoura et al. .......... 369/44.29
6,798,606 B2 * 9/2004 Tang et al. ............... 360/77.08
7,046,600 B2 * 5/2006 Matsumoto ............... 369/47.53
7,088,665 B2 * 8/2006 Ogawa et al. ............. 369/116
7,215,606 B2 * 5/2007 Yonezawa ................ 369/44.29

FOREIGN PATENT DOCUMENTS

| JP | 2003-051128 A | 2/2003 |
| JP | 2003-099925 A | 4/2003 |
| JP | 2003-157554 A | 5/2003 |

* cited by examiner

*Primary Examiner*—Thang V. Tran
*Assistant Examiner*—Adam R. Giesy
(74) *Attorney, Agent, or Firm*—McDermott Will & Emery LLP

(57) ABSTRACT

An optical disk apparatus and an optical disk recording and reproducing method are provided in which an actuator can be controlled in stable fashion at the time of high-speed recording operation. Before performing the high-speed recording operation under servo control of average type, the learning of a servo signal of average type by application of a disturbance signal is carried out for both the servo control of continuous servo type for reproduction and the servo control of sample-and-hold type for low-speed recording operation. Based on the result of the learning, the gain is set for a servo loop of average servo type for high-speed recording operation.

6 Claims, 7 Drawing Sheets

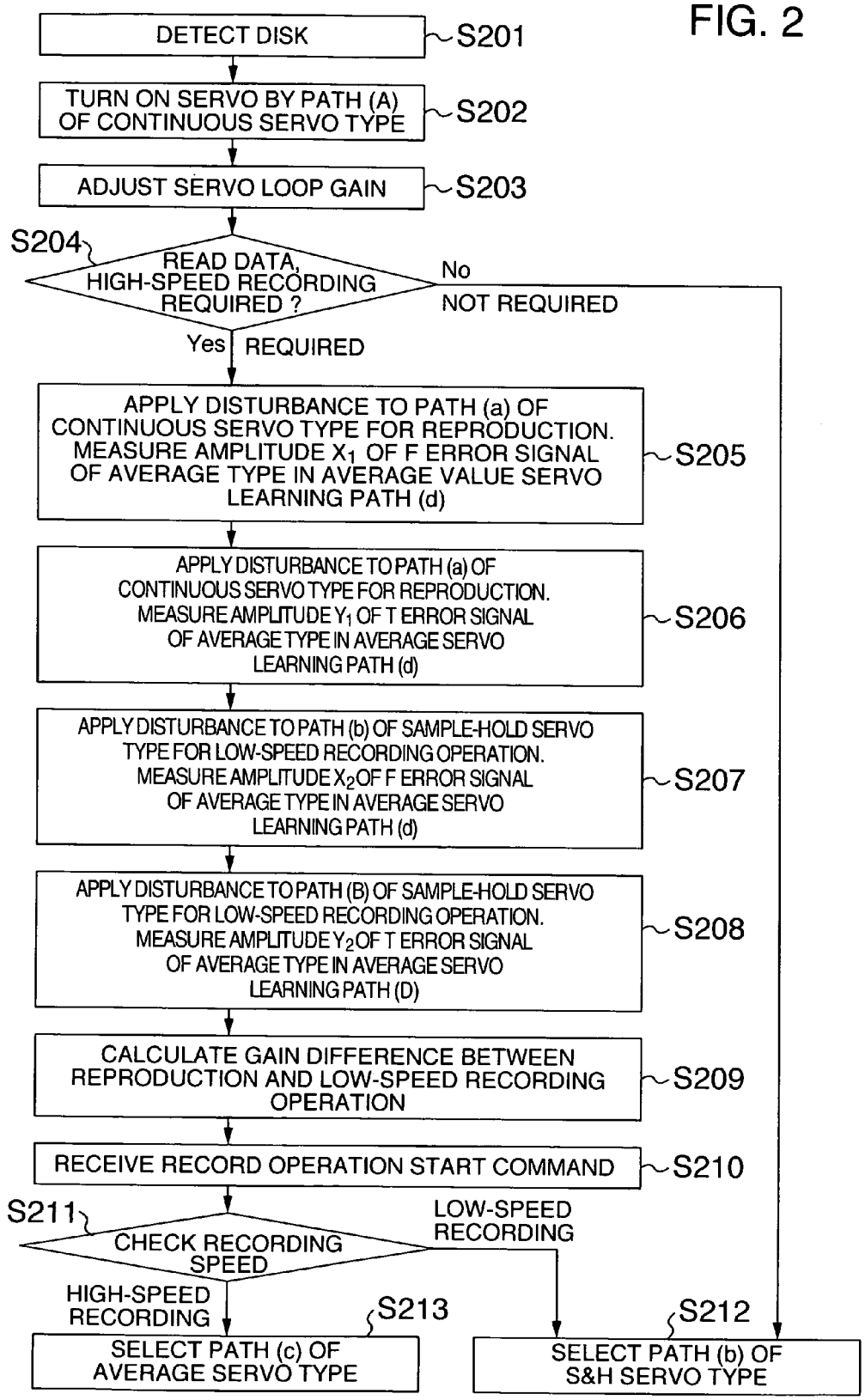

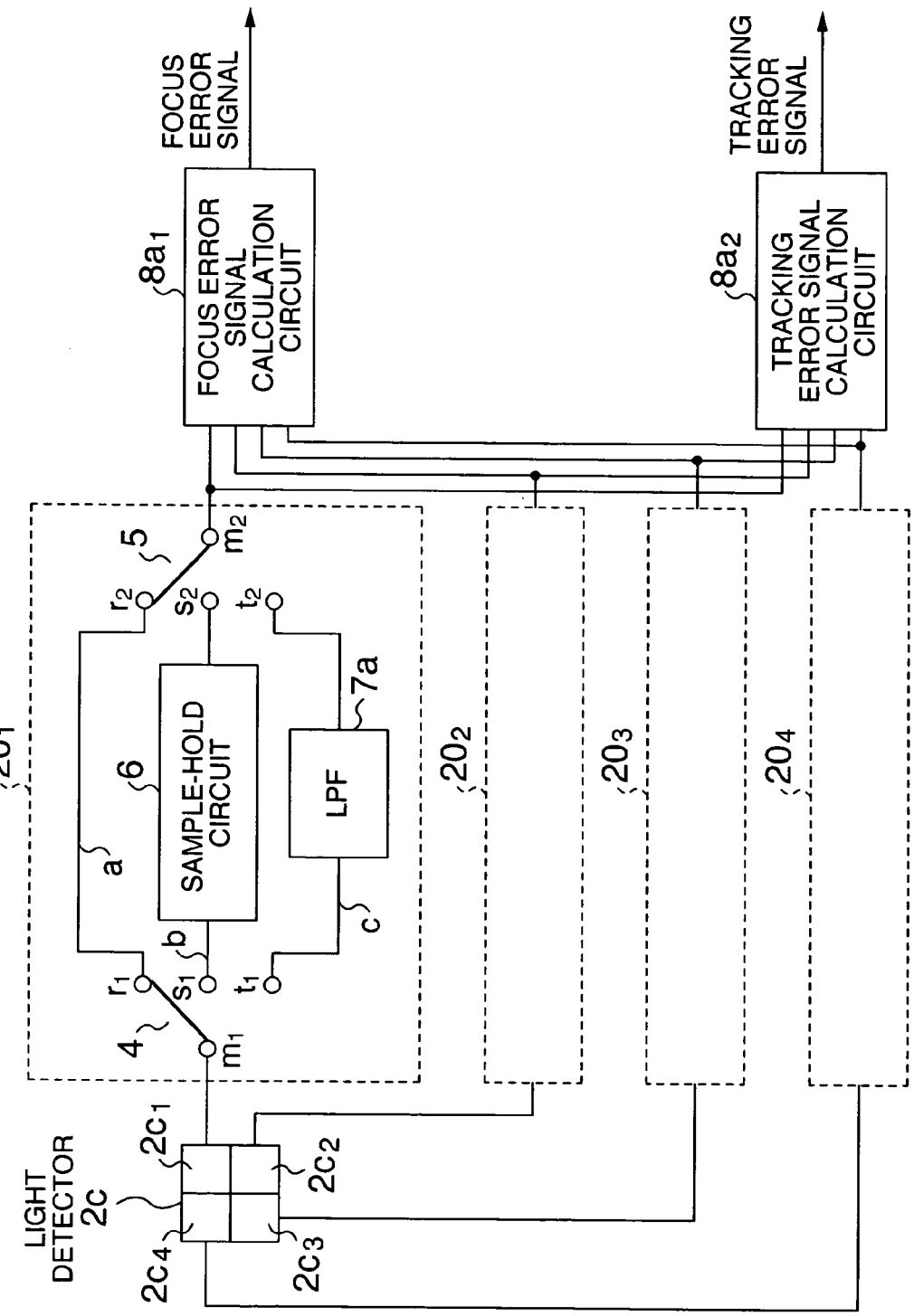

RECORDING SIGNAL
(LIGHT-EMISSION PATTERN)

LIGHT DETECTION SIGNAL

SAMPLE PULSES

RECORDING SIGNAL
(LIGHT-EMISSION PATTERN)

LIGHT DETECTION SIGNAL

SAMPLE PULSES

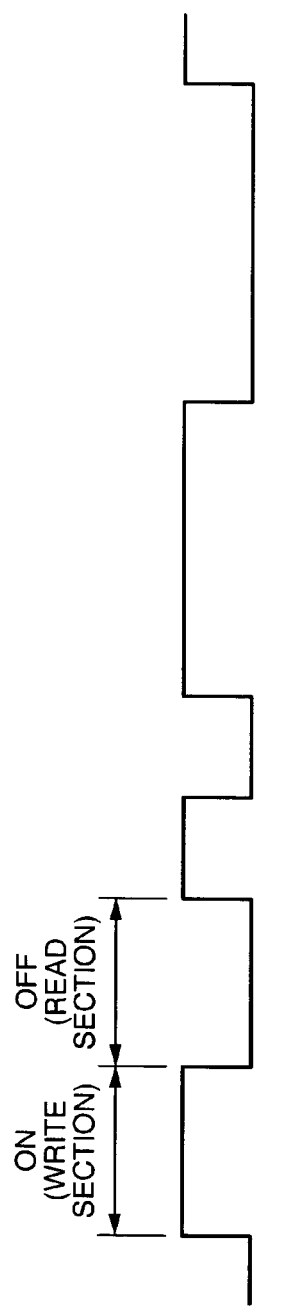
FIG. 6A
RECORDING SIGNAL
(LIGHT-EMISSION PATTERN)
FIG. 6B
LIGHT DETECTION SIGNAL
FIG. 6C
AVERAGE VALUE OF
LIGHT DETECTION SIGNAL
(HF COMPONENT REMOVED)

LIGHT DETECTION SIGNAL

AVERAGE VALUE OF
LIGHT DETECTION SIGNAL
(HF COMPONENT REMOVED)

OPTICAL DISK APPARATUS AND AN OPTICAL DISK RECORDING AND REPRODUCING METHOD

INCORPORATION BY REFERENCE

The present application claims priority from Japanese application JP 2003-413395 filed on Dec. 11, 2003, the content of which is hereby incorporated by reference into this application.

BACKGROUND OF THE INVENTION

1. Field of the Invention

The present invention relates to an optical disk apparatus for recording or reproducing the information on an optical disk, or in particular to a technique for controlling the actuator of an optical pickup.

2. Description of the Related Art

The conventional techniques related to this invention are described in JP-A-2003-51128, JP-A-2003-157554 and JP-A-2003-99925. JP-A-2003-51128 describes a technique for attenuating the amplitude level of a light detector detection signal before gain adjustment in the mean servo system to stabilize the actual control operation in accordance with the servo signal and the sum signal for high-speed recording in an optical disk. JP-A-2003-157554 describes the technique in which a tracking error signal is generated by removing the frequency component of not less than one half of the sampling frequency of an analog-to-digital converter in the average servo system in order to eliminate the amplitude adjustment error to assure stable tracking servo control in the average servo system even in the case where the tracking error signal becomes a high-frequency signal and attenuated on the one hand and the amplification factor of a gain amplifier is variably controlled in order that the amplitude of the output signal of a gain amplifier substantially coincides with a reference amplitude value on the other hand. Also, JP-A-2003-99925 describes the technique in which in order to accurately detect the wobble signal at low cost and accurately regardless of the recording conditions for recording the information in an optical recording medium, a wobble signal detection unit includes a sample-and-hold means for sampling and holding a photoelectric conversion signal and accurately removing the noise component not related to the wobble signal, and a high-frequency band limiting means for removing the high-frequency component of not less than the cut-off frequency in the photoelectric conversion signal, wherein any of the techniques is activated in accordance with the recording conditions.

SUMMARY OF THE INVENTION

In all the conventional techniques described above, assume that the servo loop of the sample-and-hold system and the servo loop of the average servo system are switched to each other. The gain of the servo system is different between the two loops, and therefore the stability of the servo loop may be reduced, thereby making it impossible to secure a predetermined control accuracy of the actuator.

In view of these problems of the conventional techniques, according to this invention, there is provided an optical disk apparatus in which a servo loop for controlling the actuator in stable fashion can be formed, and accurate, stable tracking and focus control can be assured in the case where the recording operation is performed at different recording speeds, especially in a high-speed recording operation.

An object of this invention is to solve the problem points described above and provide an actuator control technique which can easily meet the requirement for high-speed recording operation of an optical disk apparatus.

In order to achieve this object, according to one feature of this invention, there is provided an optical disk apparatus, wherein prior to the high-speed recording operation by servo control of average type, the learning of a servo signal of average type by application of a disturbance signal is conducted for both the servo control by continuous servo type for reproduction and the servo control by sample-and-hold servo type for low-speed recording operation, and based on the result of this learning, the gain is set for a servo loop of average servo type for the high-speed recording operation. Specifically, at the time of reproduction, the servo control operation of a servo loop (first servo loop) of continuous servo type is performed while applying a first disturbance signal to the servo loop thereby to produce a first learning servo signal of average type from a reproduction signal. At the time of low-speed recording operation, on the other hand, the servo control is carried out with a servo loop (second servo loop) of sample-and-hold servo type, while applying a second disturbance signal to the servo loop thereby to produce a second learning servo signal of average type from the reproduction signal. Based on the result of comparing the first and second learning servo signals with each other, the gain is set for a servo loop (third servo loop) of average servo type, and an actuator is controlled by the servo loop (third servo loop) with the gain thereof set to carry out the high-speed recording operation.

According to the invention, a stable, accurate tracking control and focus control are made possible even at the time of high-speed recording operation in an optical disk apparatus.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram for explaining the operation of controlling an actuator in the apparatus shown in FIG. 1.

FIG. 3 is a diagram showing an example of a configuration of a light detector and a servo signal producing circuit.

FIGS. 6A-6C are waveform diagrams for explaining the light detection signal waveform of average servo type.

DETAILED DESCRIPTION OF THE INVENTION

Embodiments of the invention are explained below with reference to the accompanying drawings. FIGS. 1 to 7 are diagrams for explaining an embodiment of the invention.

Figure 1:
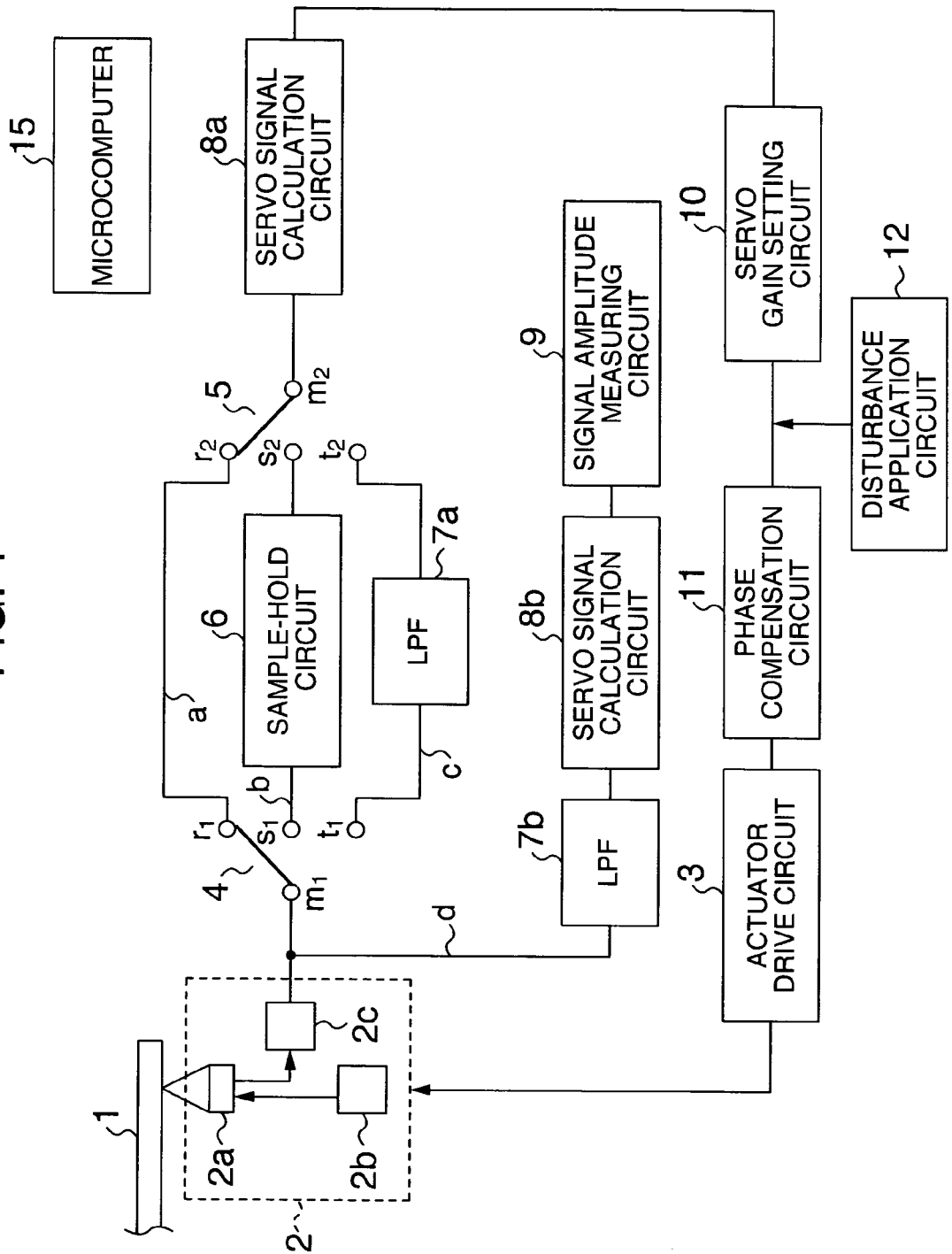
FIG. 1 is a diagram showing an example of a configuration of an optical disk apparatus according to an embodiment of the invention.

In FIG. 1, reference numeral 1 designates an optical disk, numeral 2 an actuator, numeral 2a an objective lens, numeral 2b a laser diode for emitting a laser beam, numeral 2c a light detector for receiving the laser beam reflected from the optical disk 1 through the objective lens 2a, numeral 3 an actuator drive circuit for driving the actuator 2, numeral 6 a sample-and-hold circuit constituting a sample-and-hold circuit, and numeral 7a a low-pass filter (hereinafter referred to as the LPF) making up an averaging circuit to determine an average value of the reproduction signal. Reference character a designates a first signal path for passing the reproduction signal continuously from the light detector 2, character b a second signal path having a sample-and-hold circuit 6, character c a third signal path having the LPF 7a, character d a fourth signal path for producing a learning servo signal of average servo type, numerals 4, 5 a change-over switch constituting a signal path select circuit, and numeral 8a a servo signal calculation circuit for calculating the output from the first signal path a, the second signal path b or the third signal path c and producing a servo signal by servo signal calculation. Numeral 7b designates a LPF constituting an averaging circuit arranged in the fourth signal path d for producing the learning servo signal of average type to determine an average value of the reproduction signal. Numeral 8b designates a servo signal calculation circuit as a servo signal calculation circuit arranged in the fourth signal path d for calculating the output of the LPF 7b and producing first and second learning servo signals. Numeral 9 designates a signal amplitude measuring circuit for measuring the amplitude of the output signal of the servo signal calculation circuit 8b. Numeral 10 designates a servo gain setting circuit for setting the gain of the servo loop. Numeral 11 designates a phase compensation circuit for compensating the phase of the servo loop. Numeral 12 designates a disturbance signal application circuit making up a disturbance signal application circuit to apply a disturbance signal to the servo loop. Numeral designates a microcomputer constituting a control circuit for controlling the apparatus as a whole.

The first signal path a, the servo signal calculation circuit 8a, the servo gain setting circuit 10, the phase compensation circuit 11, the actuator drive circuit 3 make up a first servo loop of continuous servo type. The servo loop of continuous servo type is such that servo control in reproducing operation is conducted based on an average value of received light signals in the reproducing operation. The first servo loop is turned in on state with the terminals $m_1$, $r_1$ of the change-over switch 4 and the terminals $m_2$, $r_2$ of the change-over switch 5 being connected. The second signal path b including the sample-and-hold circuit 6, the servo signal calculation circuit 8a, the servo gain setting circuit 10, the phase compensation circuit 11 and the actuator drive circuit 3 make up a second servo loop of sample-and-hold servo type. The servo loop of sample-and-hold servo type is such that servo control in recording operation is conducted based on a sampling value of received light signals in the recording operation. The second servo loop is turned on with the terminals $m_1$, $s_1$ of the change-over switch 4 and the terminal $m_2$, $S_2$ of the change-over switch 5 being connected. The third signal path c including the LPF 7a, the servo signal calculation circuit 8a, the servo gain setting circuit 10, the phase compensation circuit 11 and the actuator drive circuit 3 make up a third servo loop of average servo type. The servo loop of average type is such that servo control in recording operation is conducted based on an average of received light signals in the recording operation. The third servo loop is turned on with the terminals $m_1$, $t_1$ of the change-over switch 4 and the terminal $m_2$, $t_2$ of the change-over switch 5 being connected. The change-over switches 4, 5 are also controlled by the microcomputer 15. In a fourth signal path d, the LPF 7b and the servo signal calculation circuit 8b make up a learning servo signal producing circuit. The learning servo signal producing circuit is activated when the first servo loop is in on state and when the second servo loop is in on state, so that a learning servo signal of average type is produced based on the disturbance signal applied to each servo loop.

The learning of the servo signal of average type by application of the disturbance signal is carried out before the high-speed recording operation under the servo control of average type. This learning operation is performed by producing the learning servo signal of average type by servo control of continuous servo type of the first servo loop at the time of reproduction and by servo control of sample-and-hold servo type of the second servo loop at the time of low-speed recording operation. In accordance with the result of learning, the gain is set in the servo loop of average type for the high-speed recording operation. This learning operation is performed by applying the disturbance signal from a disturbance application circuit 12 to the first servo loop for reproduction and the second servo loop for low-speed recording operation, respectively. Specifically, at the time of reproduction, the first disturbance signal is applied to the first servo loop under the servo control of the servo loop of continuous servo type (first servo loop), and a first learning servo signal of average type is produced from the reproduction signal based on a first disturbance signal in the fourth signal path d. At the time of low-speed recording operation, on the other hand, a second disturbance signal is applied to the servo loop of sample-and-hold type (second servo loop) under the servo control of the same servo loop, and a second learning servo signal of average type is produced from the reproduction signal based on the second disturbance signal in the fourth signal path d. After that, the amplitude values of the first and second learning servo signals thus produced are compared with each other, and based on the result of comparison, the gain setting operation of the servo loop of average servo type (third servo loop) is controlled and the actuator is controlled by the servo loop with the gain thereof set (third servo loop) to perform the high-speed recording operation. The gain is set in such a manner as to secure an appropriate value of the phase and gain of the third servo loop. The gain setting operation based on the series of learning operation described above is performed under control of the microcomputer 15.

While the first servo loop is in on state (at the time of reproduction), the first disturbance signal of sinusoidal wave is applied to the servo loop. Upon application of the first disturbance signal, the reproduction signal based on the first disturbance signal is averaged by the LPF 7b into an average waveform in the signal path d. Further, the first learning servo signal is produced by the calculation in the servo signal calculation circuit 8b. The amplitude of the first learning servo signal is measured (observed) in the signal amplitude measuring circuit 9. As the first learning servo signal, a first focus error signal and a first tracking error signal are produced and the amplitude of both signals are measured (observed). In similar fashion, while the second servo loop is in on state (at the time of low-speed recording operation), the second disturbance signal (assumed to be equivalent to the first disturbance signal) of sinusoidal wave is applied to the second servo loop. Upon application of the second disturbance signal, the reproduction signal based on the second disturbance signal is averaged out into an average waveform by the LPF 7*b* in the signal path d. Further, the second learning servo signal is produced by calculation in the servo signal calculation circuit 8*b*. The amplitude of the second learning servo signal is measured (observed) in the signal amplitude measuring circuit 9. As the second learning servo signal, a second focus error signal and a second tracking error signal are produced and the amplitude of each signal is measured (observed).

The microcomputer 15 making up a control means compares the amplitude value of the first focus error signal with the amplitude value of the second focus error signal, compares the amplitude value of the first tracking error signal with the amplitude value of the second tracking error signal, and based on the result of comparison, controls the gain setting of the third servo loop of average servo type including the signal path c having the LPF 7*a*. The actuator 2 is controlled by the third servo loop of the set gain, and the optical disk apparatus is caused to perform the high-speed recording operation. The gain setting operation is performed by the servo gain setting circuit 10 under the control of the microcomputer 15.

FIG. 2 is a diagram for explaining the operation of controlling the actuator in the optical pickup of the optical disk apparatus shown in FIG. 1. The component parts of the optical disk apparatus of FIG. 1 used in the explanation of FIG. 2 are designated by the same reference numerals as in FIG. 1.

In FIG. 2,
(1) When the optical disk is mounted on the optical disk apparatus, the disk is detected under the control of the microcomputer 15 (step S201).
(2) The servo control of continuous servo type is turned on (step S202).
(3) In order to compensate for the variations in the servo loop gain due to the sensitivity error of the optical pickup, the actuator drive circuit 3 and the DSP (digital signal processor) (not shown), the microcomputer 15 performs the initial adjusting operation in which the gain is adjusted by the servo gain setting circuit 10 and the phase by the phase compensation circuit 11 thereby to set the gain and the phase of the servo loop at an appropriate value (step S203).
(4) The microcomputer 15, turning on the servo control function with the servo loop of continuous servo type (first servo loop) including the signal path a, causes the apparatus to start reading the data from the optical disk 1 and determines whether the high-speed recording operation is required or not (step S204).
(5) When the determination in step S204 shows that the high-speed recording is required, the microcomputer 15 causes the the disturbance application circuit 12 to apply the first disturbance signal of sinusoidal wave to the focus servo loop of continuous servo type at the time of reproduction in the servo loop of continuous servo type (first servo loop), causes the LPF 7*b* and the servo signal calculation circuit 8*b* to produce a focus error signal as a first learning servo signal of average type from the reproduction signal based on the first disturbance signal in the fourth signal path d, and then causes the signal amplitude circuit 9 to measure (observe) the amplitude value $X_1$ of the focus error signal (step S205). The amplitude value $X_1$ thus measured is stored in the storage means (not shown) of the apparatus.
(6) Further, at the time of reproduction, the microcomputer 15 causes the disturbance application circuit 12 to apply the first disturbance signal of sinusoidal wave to the track servo loop system of the servo loop of continuous servo type (first servo loop), causes the LPF 7*b* and the servo signal calculation circuit 8*b* to produce a tracking error signal as a first learning servo signal of average type in the fourth signal path d from the reproduction signal based on the first disturbance signal, and causes the signal amplitude circuit 9 to measure (observe) the amplitude value $Y_1$ of the tracking error signal (step S206) The amplitude value $Y_1$ thus measured is stored in the storage means (not shown) of the apparatus.
(7) The microcomputer 15, changing the connection of the change-over switches 4, 5, switches to the servo loop of sample-and-hold type (second servo loop) including the second signal path b, and at the time of low-speed recording operation, causes the disturbance application circuit 12 to apply a second disturbance signal of sinusoidal wave to the focus servo loop of sample-and-hold type. Thus, in the fourth signal path d, the LPF 7*b* and the servo signal calculation circuit 8*b* produces a focus error signal as a second learning servo signal of average type from the reproduction signal based on the second disturbance signal. Then, the signal amplitude circuit 9 measures (observes) the amplitude value $X_2$ of the focus error signal (step S207), and the amplitude value $X_2$ thus measured is stored in the storage means (not shown) of the apparatus.
(8) At the time of low-speed recording operation, the microcomputer 15 causes the disturbance application circuit 12 to apply the second disturbance signal of sinusoidal wave to the tracking servo loop of sample-and-hold type, and in the fourth signal signal path d, causes the LPF 7*b* and the servo signal calculation circuit 8*b* to produce a tracking error signal as a second learning servo signal of average type from the reproduction signal based on the second disturbance signal. Then, the signal amplitude circuit 9 is caused to measure (observe) the amplitude value $Y_2$ of the tracking error signal (step S208). The amplitude value $Y_2$ thus measured is stored in the storage means (not shown) of the apparatus.
(9) The microcomputer 15 compares the amplitude values $X_1$ and $X_2$ of the focus error signal and the amplitude values $Y_1$ $_{and}$ $_{Y2}$ of the tracking error signal measured as described above, and based on the result of comparison, calculates the gain difference of the servo loop between the reproduction mode and the recording mode (step S209).
(10) A recording operation start command is received from the host computer (not shown) (step S210).
(11) The microcomputer 15 checks the recording speed (step S211).
(12) When the check in step S211 shows a high-speed recording operation, the microcomputer 15 selects the servo loop of average type (third servo loop) including the third signal path c through the change-over switches 4, 5. At the same time, the gain of the servo loop of average type is set to the value calculated in step S209 by the servo gain setting circuit 10, and with the gain thus set, the high-speed recording operation is started under servo control (step S213). Assume that the comparison of the amplitude value of the error signal in step S209 shows that the amplitude value of the error signal at the time of recording operation is twice that at the time of reproduction. The sensitivity of the optical pickup and the DSP is reduced to one half of the value by the servo gain setting circuit 10, so that the gain of the servo loop for recording operation is set to one half. Thus, the signal amplitude for recording operation becomes equivalent to that for reproduction operation. Also, the phase characteristic of the servo loop of average type is adjusted by the phase compensation circuit 11. The phase characteristic may alternatively be adjusted by setting the gain. In this case, the gain is set to such a value that both the gain margin and the phase margin can assume an appropriate value.

(13) When the check in step S211 shows a low-speed recording operation, on the other hand, the microcomputer 15 selects the servo loop of sample-and-hold type (second servo loop) including the second signal path b through the change-over switches 4, 5 thereby to start the low-speed recording operation under servo control (step S212).

(14) When the determination in step S204 shows that the high-speed recording operation is not required, the microcomputer 15 selects the servo loop of sample-and-hold type (second servo loop) including the second signal path b through the change-over switches 4, 5 thereby to start the low-speed recording operation under servo control.

A series of operations of the microcomputer 15 described above are performed by executing the operating steps according to a preset program. This program is stored in a memory of the microcomputer 15 or another storage means in the apparatus.

FIG. 3 shows an example of a configuration of the light detector 2c and the servo signal forming circuit (the first signal path a, the second signal path b, the third signal path c and the servo signal calculation circuit 8a) in the optical disk apparatus shown in FIG. 1. The servo signal calculation circuit 8a includes a focus error calculation circuit 8a$_1$ and a tracking error calculation circuit 8a$_2$. The focus error calculation circuit 8a$_1$ produces a focus error signal as a servo signal, and the tracking error calculation circuit 8a$_2$ a tracking error signal as a servo signal.

In FIG. 3, the light detector 2c is so configured that the light-detection surface is divided into four parts, and each part of the light-receiving surface receives the laser beam reflected from the optical disk surface and outputs a corresponding electrical signal. The light-receiving surface parts 2c$_1$, 2c$_2$, 2c$_3$, 2c$_4$ of the light detector 2c are connected with switching signal paths 20$_1$, 20$_2$, 20$_3$, 20$_4$, respectively, a focus error calculation circuit 8a$_1$ and a tracking error calculation circuit 8a$_2$. At the time of servo control of continuous servo type, the first signal path a of the switching signal paths 20$_1$, 20$_2$, 20$_3$, 20$_4$, the focus error calculation circuit 8a$_1$ and the tracking error calculation circuit 8a$_2$ are connected with each other. In the case where the servo control of sample-and-hold type is effected, on the other hand, the second signal path b in the switching signal paths 20$_1$, 20$_2$, 20$_3$, 20$_4$, the focus error calculation circuit 8a$_1$ and the tracking error calculation circuit 8a$_2$ are connected with each other. In the case where the servo control of average servo type is effected, on the other hand, the third signal path c in the switching signal paths 20$_1$, 20$_2$, 20$_3$, 20$_4$, the focus error calculation circuit 8a$_1$ and the tracking error calculation circuit 8a$_2$ are connected to each other.

Figure 4A:
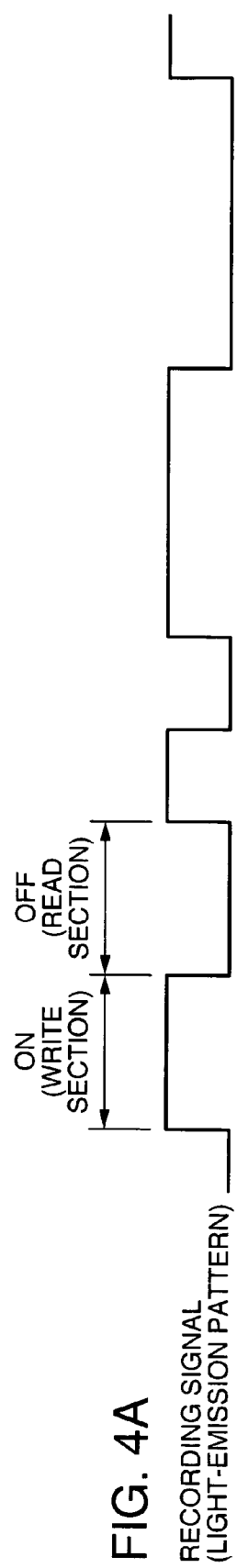
FIGS. 4A-4C are waveform diagrams for explaining the sampling operation by sample-and-hold servo type for low-speed recording operation.
Figure 4B:
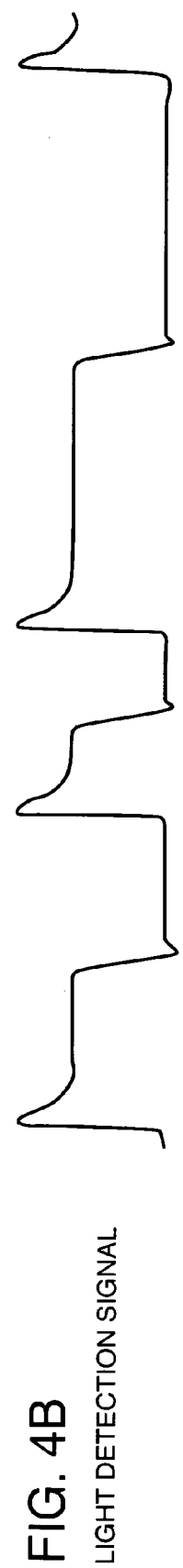
Figure 4C:

FIGS. 4A-4C show waveforms for explaining the sampling operation at the time of low-speed recording operation of sample-and-hold type.

FIG. 4A shows a waveform of the recording signal, FIG. 4B a waveform of a light detection signal (reproduced electrical signal) output from the light detector 2c, and FIG. 4C a waveform of sample pulses in the sample-and-hold circuit. The portion of the light detection signal corresponding to the off-period (read period) of the recording signal is sampled thereby to form a servo error signal (focus error signal and a tracking error signal). At the time of low-speed recording operation, the off-period (read period) of the recording signal is so long that the portion of the light detection signal corresponding to the off-period is also widened. As a result, the width of the sample pulse is secured and the servo error signal can be positively formed.

Figure 5A:
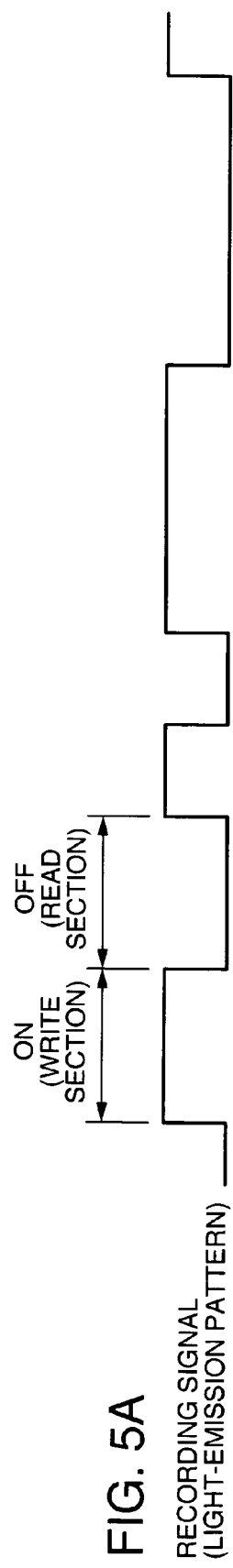
FIGS. 5A-5C are waveform diagrams for explaining the sampling operation by sample-and-hold servo type for high-speed recording operation.
Figure 5B:
Figure 5C:

FIGS. 5A-5C show waveforms for explaining the sampling operation for the high-speed recording operation of sample-and-hold type.

As in FIG. 4, FIG. 5A shows a waveform of the recording signal, FIG. 5B a waveform of a light detection signal (reproduced electrical signal) output from the light detector 2c, and FIG. 5C a waveform of sample pulses in the sample-and-hold circuit. During the high-speed recording operation, the off-period (read period) of the recording signal is so short that the portion of the light detection signal corresponding to the off-period is narrowed, thereby often making it impossible to secure the width of the sample pulse. As a result, it becomes difficult to form the servo error signal positively. This invention is intended to obviate this problem.

FIGS. 6A-6C show waveforms for explaining the light detection signal waveforms of average servo type.

FIG. 6A shows a waveform of a recording signal (light emission pattern of the laser diode), FIG. 6B an example of a waveform of the light detection signal (reproduced electrical signal) output from the light detector 2c, and FIG. 6C the average value of the light detection signal with the high-frequency portion thereof removed by the LPF 7a or the LPF 7b. In the third servo loop of average servo type in the apparatus shown in FIG. 1, the third servo signal forming means (LPF 7a and servo signal calculation circuit 8a) and the learning servo signal forming means (LPF 7b and servo signal calculation circuit 8b) form a servo signal based on the average value of the light detection signal.

Figure 7A:
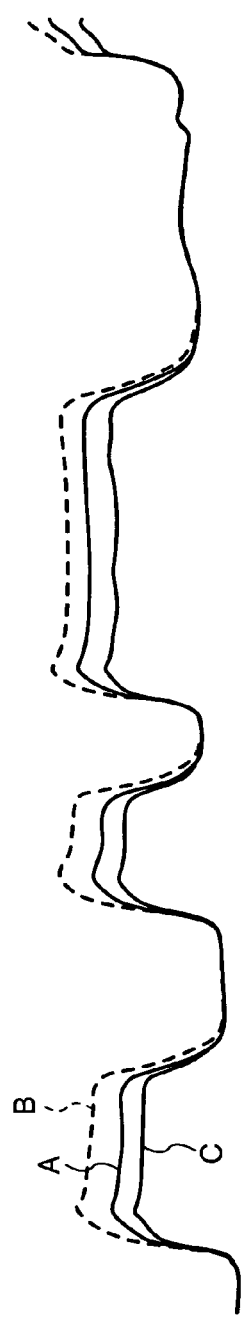
FIGS. 7A and 7B are waveform diagrams for explaining the variations in detection sensitivity of average servo type.
Figure 7B:
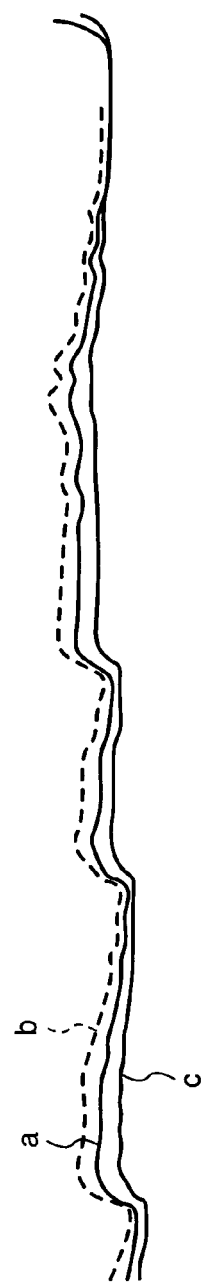

FIGS. 7A-7B show waveforms for explaining the variations in detection sensitivity of the average servo system. In the case where the light detection signal is varied between the optical disk devices or optical disks as shown in A, B, C or develops secular variations, the average values assume levels a, b, c, respectively. Thus, the servo error signal formed based on this is reduced in accuracy. In order to improve this point, according to the invention, a series of learning operation is performed in steps S205 to S208 in FIG. 2, and based on the result of learning, the gain of the servo loop of average servo type is adjusted. In this way, the variations of the light detection signal and the effects thereof are suppressed, and the actuator can be controlled constantly with high accuracy at the time of high-speed recording operation.

According to the embodiment of the invention described above, there is provided an optical disk apparatus in which the actuator can be controlled in stable fashion even during the high-speed recording operation, thereby making possible stable, accurate tracking control and focus control.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disk recording and reproducing method for an optical disk apparatus, in which a reproducing operation is performed under servo control of an actuator in a servo loop of continuous servo type, the actuator controlling an objective lens, a low-speed recording operation is performed under servo control of the actuator controlling the objective lens in a servo loop of sample-and-hold type and a high-speed recording operation is performed under servo control of the actuator controlling the objective lens in a servo loop of average servo type, the method comprising:

a first step of applying a first disturbance signal to the servo loop of continuous servo type at the time of reproducing operation and observing a first learning servo signal of average type produced based on the first disturbance signal;

a second step of applying a second disturbance signal equivalent to the first disturbance signal to the servo loop of sample-and-hold type at the time of low-speed recording operation and observing a second learning servo signal of average type produced based on the second disturbance signal;

a third step of setting the gain of the servo loop of average servo type based on the result of comparison between the first learning servo signal and the second learning servo signal; and a fourth step of performing the high-speed recording operation under servo control of the servo loop of average servo type with the gain set by the third step.

2. A disk recording and reproducing method according to claim 1, wherein the first step includes a sub-step of observing at least one of a focus error signal and a tracking error signal as the first learning servo signal, and the second step includes a sub-step of observing at least one of the focus error signal and the tracking error signal as the second learning servo signal.

3. A disk recording and reproducing method according to claim 1, wherein each of the first disturbance signal applied in the first step and the second disturbance signal applied in the second step has a predetermined frequency.

4. A disk recording and reproducing method according to claim 1, wherein the first step includes a sub-step of sequentially observing a focus error signal and a tracking error signal as the first learning servo signal, and the second step includes a sub-step of sequentially observing the focus error signal and the tracking error signal as the second learning servo signal.

5. An optical disk apparatus for recording or reproducing information in a disk using a laser beam by controlling an objective lens through an actuator, the apparatus comprising a servo system for controlling the actuator controlling the objective lens, the servo system comprising:

a first servo loop which produces a servo signal continuously from a reproduction signal based on the laser beam reflected on the surface of the optical disk;

a second servo loop which produces a servo signal by sampling and holding the reproduction signal;

a third servo loop which produces a servo signal based on the average value of the reproduction signal;

a disturbance signal application circuit which applies a first disturbance signal to the first servo loop at the time of reproduction and a second disturbance signal to the second servo loop at the time of low-speed recording operation;

a learning servo signal producing circuit which produces a first learning servo signal of average type from the reproduction signal based on the first disturbance signal and a second learning servo signal of average type from the reproduction signal based on the second disturbance signal; and a control circuit which compares the first and second learning servo signals with each other and controls gain setting of the third servo loop based on the result of comparison;

wherein the actuator is controlled by the third servo loop with the gain set by the control circuit and the information is recorded at high speed in the optical disk.

6. An optical disk apparatus for recording or reproducing information to or from a disk using a laser beam by controlling an objective lens through an actuator, the apparatus comprising a servo system for controlling the actuator controlling the objective lens, the servo system comprising:

a first signal path for continuously passing a reproduction signal based on the laser beam reflected on the surface of the optical disk;

a second signal path having a sample-and-hold circuit which samples and holds the reproduction signal;

a third signal path having an averaging circuit which determines the average value of the reproduction signal;

a signal path select circuit which selects at least one of the first, second and third signal paths;

a servo signal calculation circuit which calculates an output signal from the first, second and third signal paths and producing a servo signal;

a disturbance signal application circuit which applies a first disturbance signal to the first servo loop formed to include the first signal path and the servo signal calculation circuit at the time of reproduction and applies a second disturbance signal to the second servo loop formed to include the second signal path and the servo signal calculation circuit at the time of low-speed recording operation;

a learning servo signal producing circuit which produces a first learning servo signal of average type from the reproduction signal based on the first disturbance signal and a second learning servo signal of average type from the reproduction signal based on the second disturbance signal; and a control circuit which controls the signal path select circuit, compares the first and second learning servo signals with each other, and based on the result of comparison, controls the gain setting of the third servo loop formed to include the third signal path and the servo signal calculation circuit;

wherein the actuator is controlled by the third servo loop with the gain set by the control circuit and the information is recorded at high speed in the optical disk.

* * * * *